(12) United States Patent
Fukaya

(10) Patent No.: US 8,248,638 B2
(45) Date of Patent: Aug. 21, 2012

(54) IMAGE FORMING DEVICES CONFIGURED TO FORM INDEX IMAGES AND COMPUTER READABLE MEDIA THEREFOR

(75) Inventor: Kousuke Fukaya, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1399 days.

(21) Appl. No.: 11/843,582

(22) Filed: Aug. 22, 2007

(65) Prior Publication Data

US 2008/0049273 A1    Feb. 28, 2008

(30) Foreign Application Priority Data

Aug. 28, 2006 (JP) ................. 2006-231041

(51) Int. Cl.
*G06F 3/12* (2006.01)
*G06K 15/02* (2006.01)
(52) U.S. Cl. .............. 358/1.15; 358/1.2; 358/1.11
(58) Field of Classification Search .............. None
See application file for complete search history.

(56) References Cited

U.S. PATENT DOCUMENTS

| | | | |
|---|---|---|---|
| 6,597,471 B1 * | 7/2003 | Yoshikawa | 358/1.2 |
| 2002/0012129 A1 | 1/2002 | Amemiya | |
| 2003/0147097 A1 * | 8/2003 | Kotani et al. | 358/1.18 |
| 2005/0111042 A1 * | 5/2005 | Ogiwara | 358/1.18 |
| 2005/0131923 A1 | 6/2005 | Noguchi et al. | |
| 2007/0146799 A1 * | 6/2007 | Writt | 358/302 |

FOREIGN PATENT DOCUMENTS

| | | |
|---|---|---|
| JP | 2000332985 A | 11/2000 |
| JP | 2001036843 A | 2/2001 |
| JP | 2001166898 A | 6/2001 |
| JP | 2004096688 A | 3/2004 |
| JP | 2004259027 A | 9/2004 |
| JP | 2005-136632 A | 5/2005 |
| JP | 2005-182760 A | 7/2005 |
| JP | 2006-067474 A | 3/2006 |

\* cited by examiner

*Primary Examiner* — Vincent Rudolph
(74) *Attorney, Agent, or Firm* — Baker Botts L.L.P.

(57) ABSTRACT

An image forming device capable of forming index images that correspond to a plurality of files, respectively, onto a recording medium includes an image data generating unit configured to generate one of first image data and second image data as data for forming the index image corresponding to each of the plurality of files, a file selecting unit configured to select, from the plurality of files, files for which at least one parameter related to file processing is to be detected, a parameter detecting unit configured to detect the at least one parameter for each of the selected files, a parameter judging unit configured to judge whether the at least one parameter as detected satisfies a predetermined condition, and a control unit configured to control the image data generating unit to generate one of the first image data and the second image data based on the judgment.

20 Claims, 10 Drawing Sheets

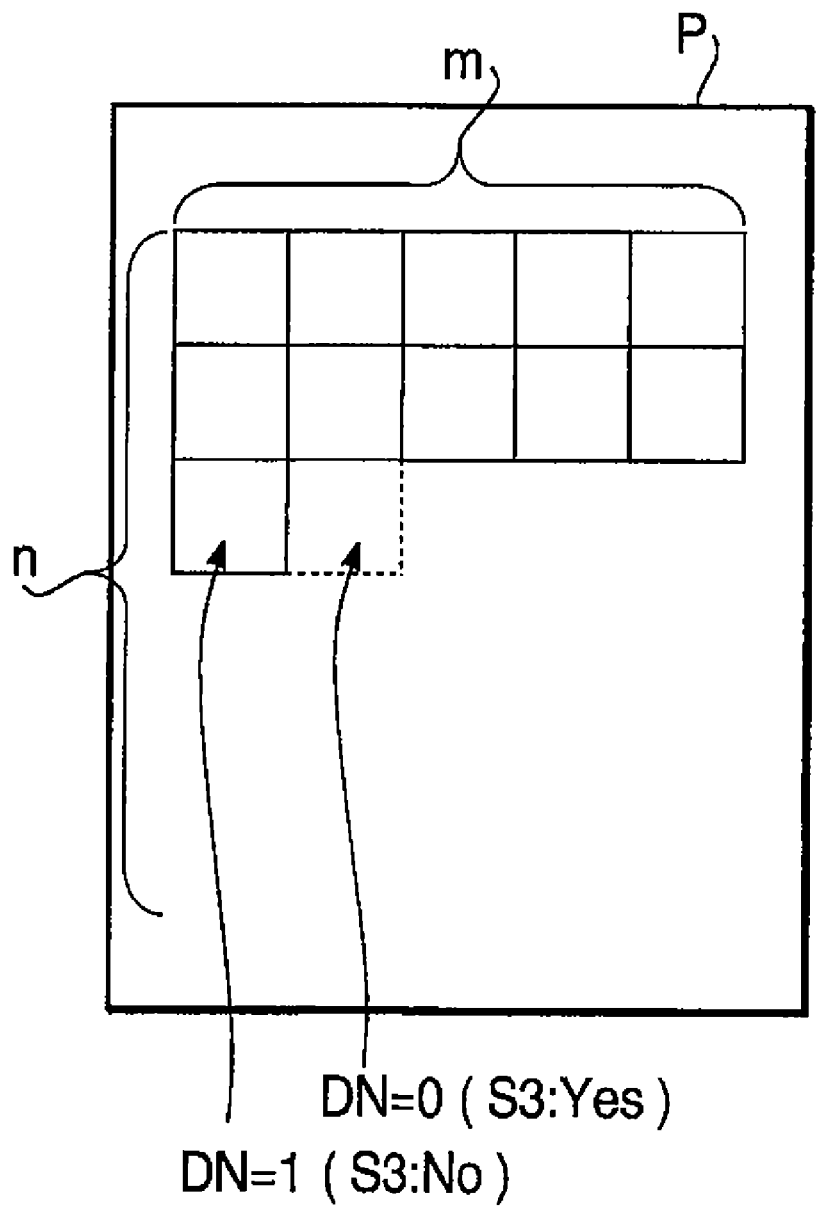

PRINTING DATA

RESOURCE INFORMATION
(NUMBER OF FONTS)
(NUMBER OF IMAGES)
(NUMBER OF PATTERNS)

PRINTING COMMAND DATA
(PATTERN COMMAND)
(TRANSPARENT COMMAND)

FIG. 6

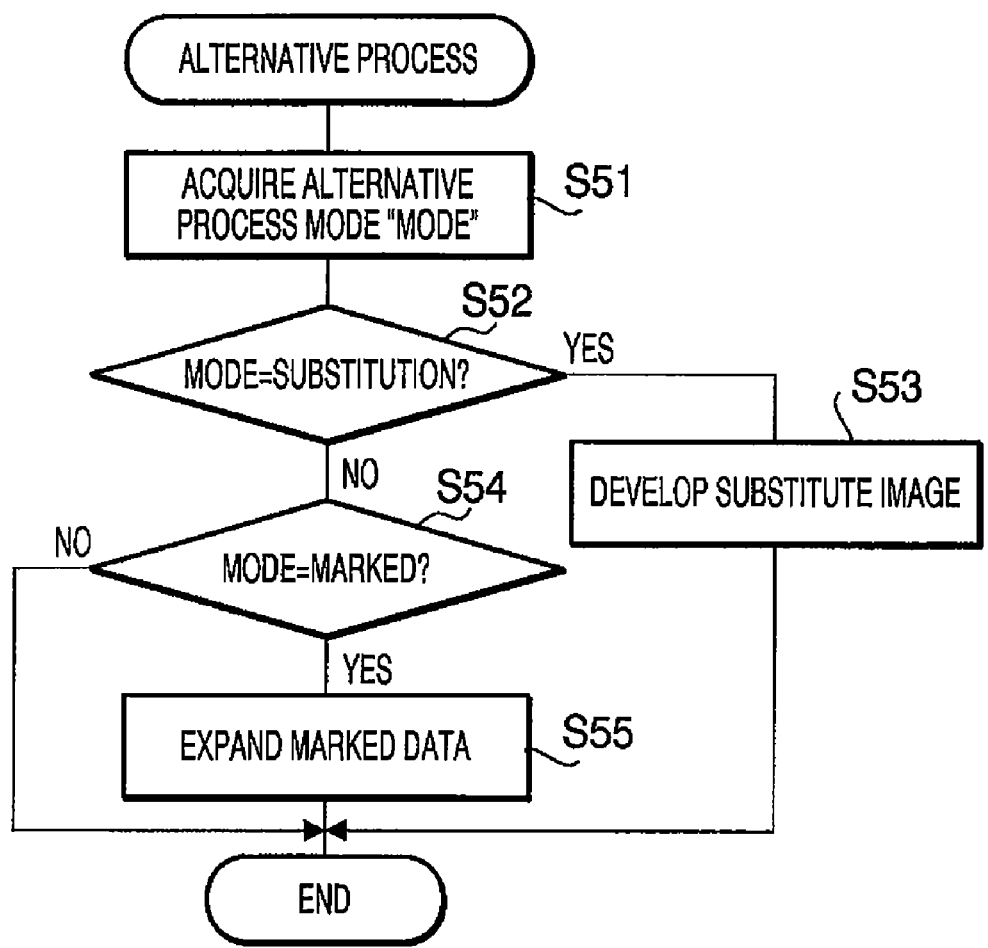
FIG. 8
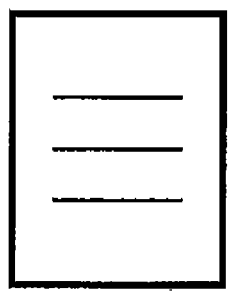 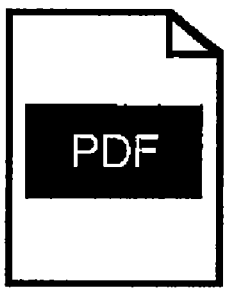 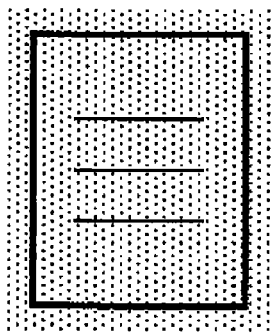
FIG.9A   FIG.9B   FIG.9C

IMAGE FORMING DEVICES CONFIGURED TO FORM INDEX IMAGES AND COMPUTER READABLE MEDIA THEREFOR

CROSS-REFERENCE TO RELATED APPLICATION

This application claims priority under 35 U.S.C. §119 from Japanese Patent Application No. 2006-231041, filed on Aug. 28, 2006. The entire subject matter of the application is incorporated herein by reference.

BACKGROUND

1. Technical Field

The following description relates to one or more image forming techniques to form index images that correspond to a plurality of files, respectively, onto a recording medium.

2. Related Art

Conventionally, there has been proposed a device configured to form, onto a paper, images that correspond to a plurality of files (e.g., a plurality of pictures taken by a digital camera) stored in a predetermined folder, respectively, as index images arranged in a matrix state (for example, see Japanese Patent Provisional Publication No. 2000-332985).

However, when forming the index images corresponding to various types of files such as a PDF file with the above device, it may take a longer time than a user expected depending on data included in the files, and thereby cause dissatisfaction of the user.

SUMMARY

Aspects of the present invention are advantageous in that there can be provided one or more improved image forming techniques that make it possible to quickly form index images that correspond to a plurality of files, respectively, onto a recording medium such as a paper without taking a long time for file processing.

According to aspects of the present invention, there is provided an image forming device capable of forming index images that correspond to a plurality of files, respectively, onto a recording medium, which includes an image data generating unit configured to generate one of first image data and second image data as data for forming the index image corresponding to each of the plurality of files, a file selecting unit configured to select, from the plurality of files, files for which at least one parameter related to file processing is to be detected, a parameter detecting unit configured to detect the at least one parameter for each of the files selected by the file selecting unit, a parameter judging unit configured to judge whether the at least one parameter detected by the parameter detecting unit satisfies a predetermined condition, and a control unit configured to control the image data generating unit to generate one of the first image data and the second image data based on the judgment by the parameter judging unit.

According to another aspect of the present invention, there is provided a computer usable medium having computer readable instructions stored thereon, which cause a computer capable of forming index images that correspond to a plurality of files, respectively, onto a recording medium to perform steps of selecting, from the plurality of files, files for which at least one parameter related to file processing is to be detected, detecting the at least one parameter for each of the selected files, judging whether the at least one parameter detected in the detecting step satisfies a predetermined condition, and generating one of first image data and second image data as data for forming an index image corresponding to each of the selected files based on the judgment in the judging step.

According to some aspects, it is possible to reduce time taken for generation of data for forming an index image by generating second image data as substitute for first image data for a file that needs much time for the generation of the data for forming the index image. Therefore, when there are formed onto a recording medium index images that correspond to a plurality of files, respectively, it is possible to quickly form the index images without taking much time for processing of the plurality of files.

BRIEF DESCRIPTION OF THE ACCOMPANYING DRAWINGS

Figure 4A:
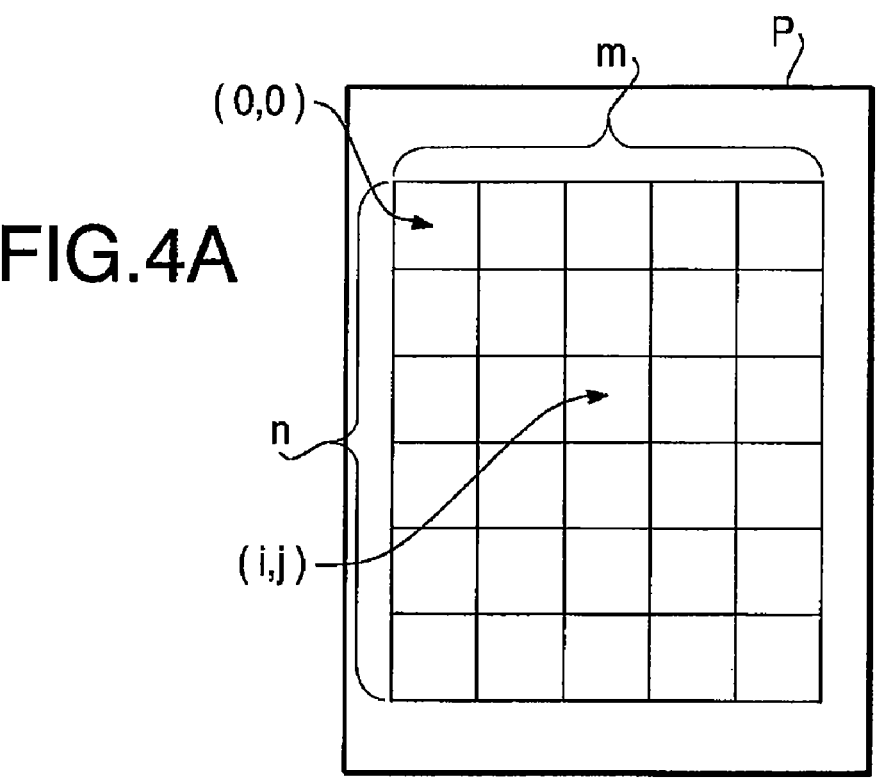
Figure 4B:
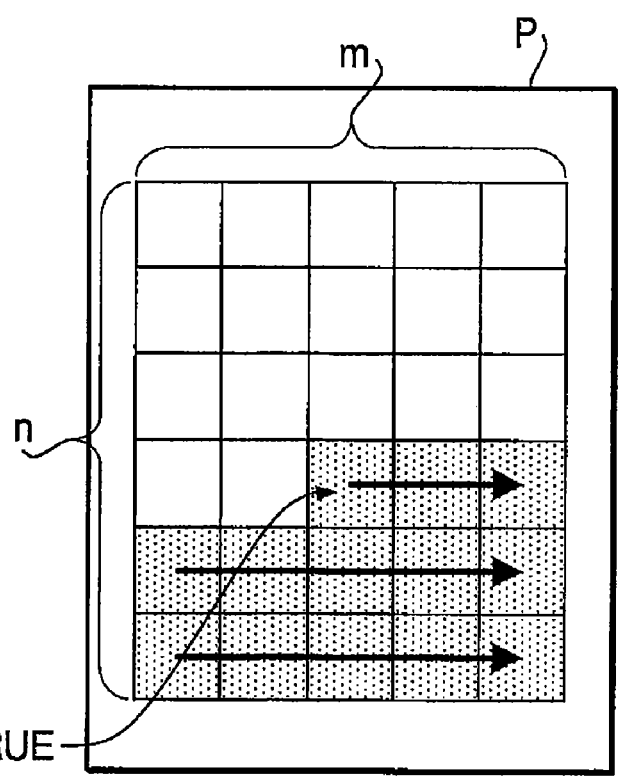

FIGS. 4A, 4B, and 4C are illustrations showing examples of printed results by the index printing process in accordance with one or more aspects of the present invention.

Figure 5:
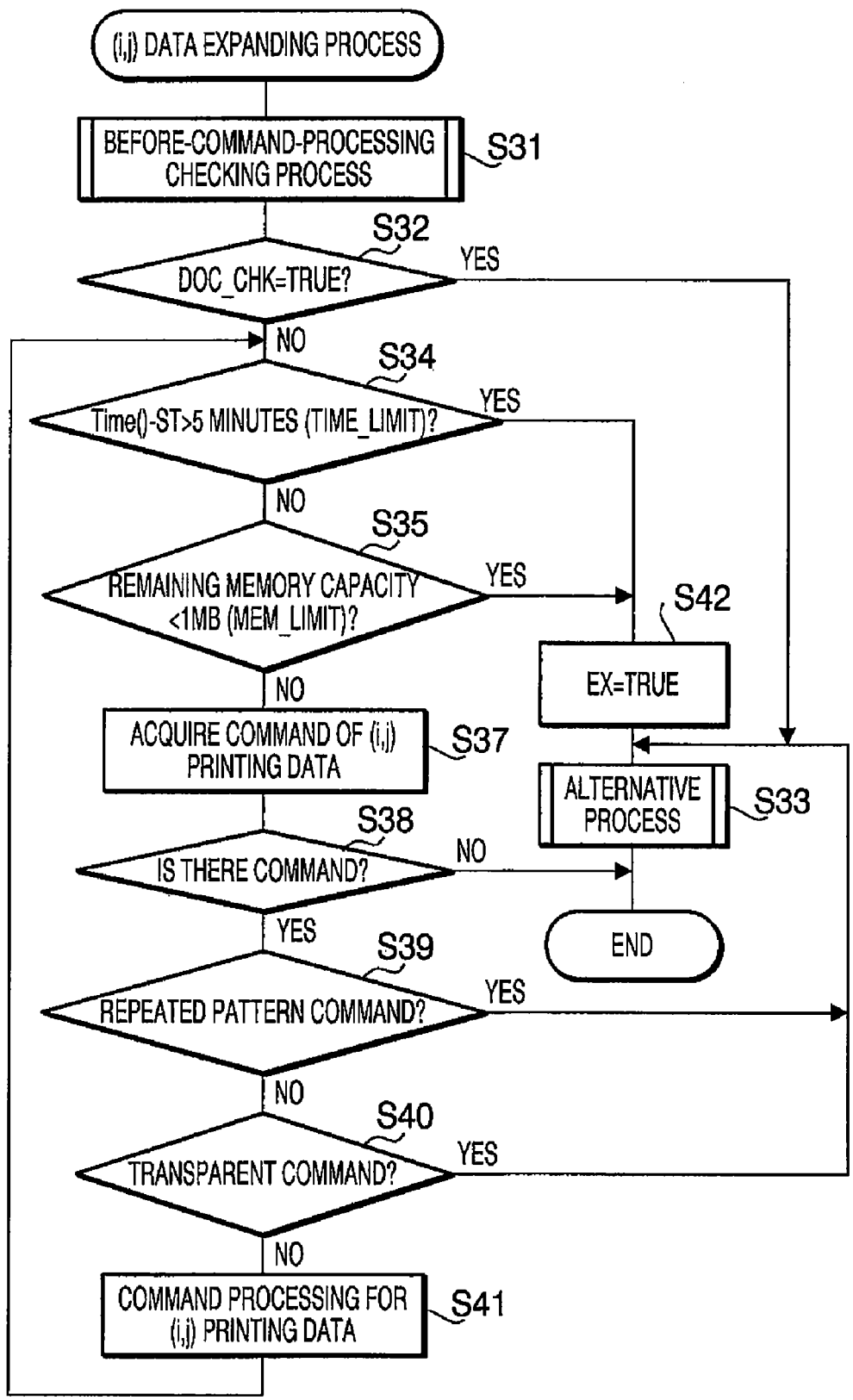

FIG. 5 is a flowchart showing a detailed procedure of an (i, j) data expanding process in the index printing process in accordance with one or more aspects of the present invention.

FIG. 6 is an illustration exemplifying a configuration of a PDF file.

Figure 7:
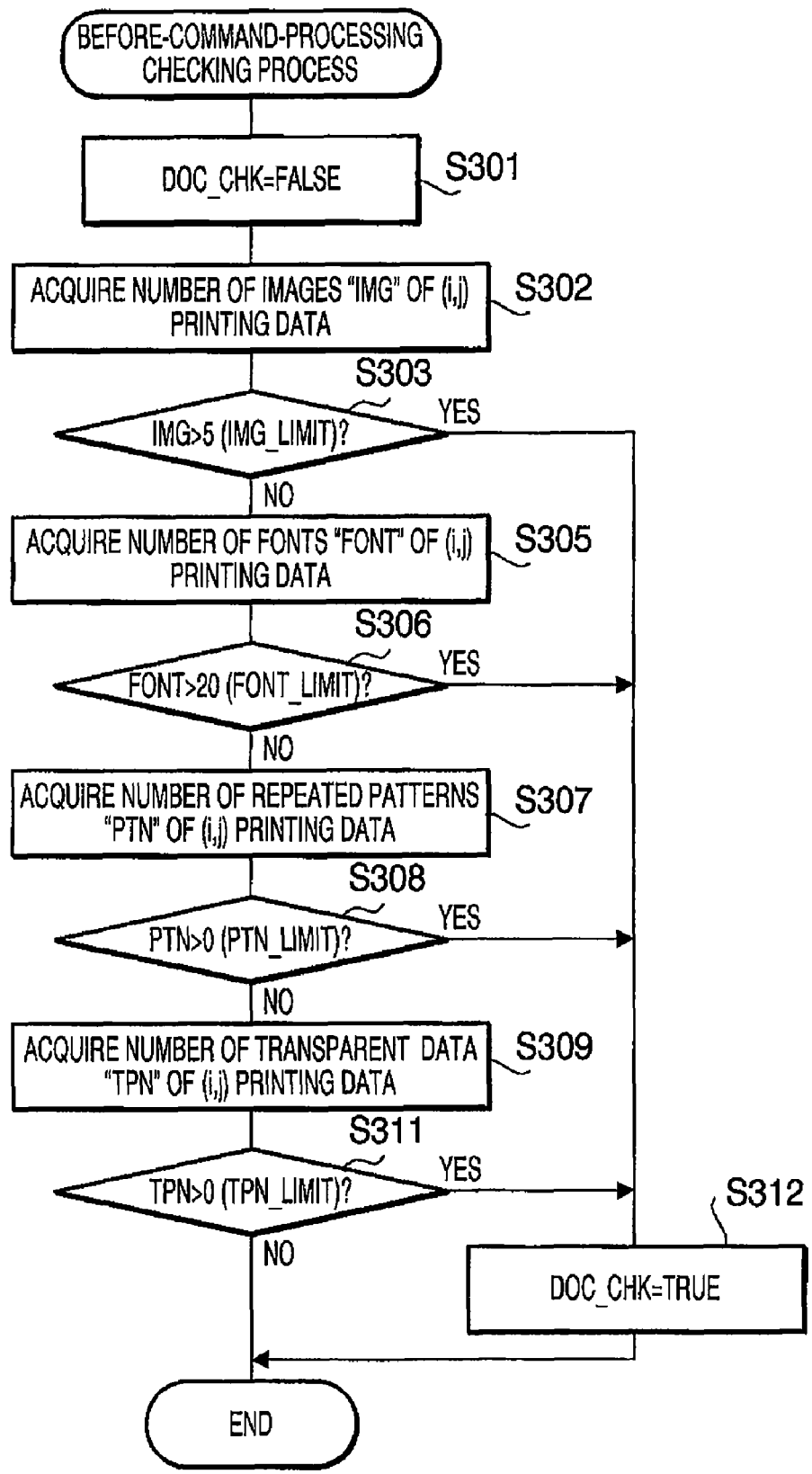

FIG. 7 is a flowchart showing a detailed procedure of a before-command-processing checking process in the (i, j) data expanding process in accordance with one or more aspects of the present invention.

FIG. 8 is a flowchart showing a detailed procedure of an alternative process in the index printing process in accordance with one or more aspects of the present invention.

FIGS. 9A, 9B, and 9C are illustrations showing examples of printed results by the alternative process in accordance with one or more aspects of the present invention.

Figure 10:
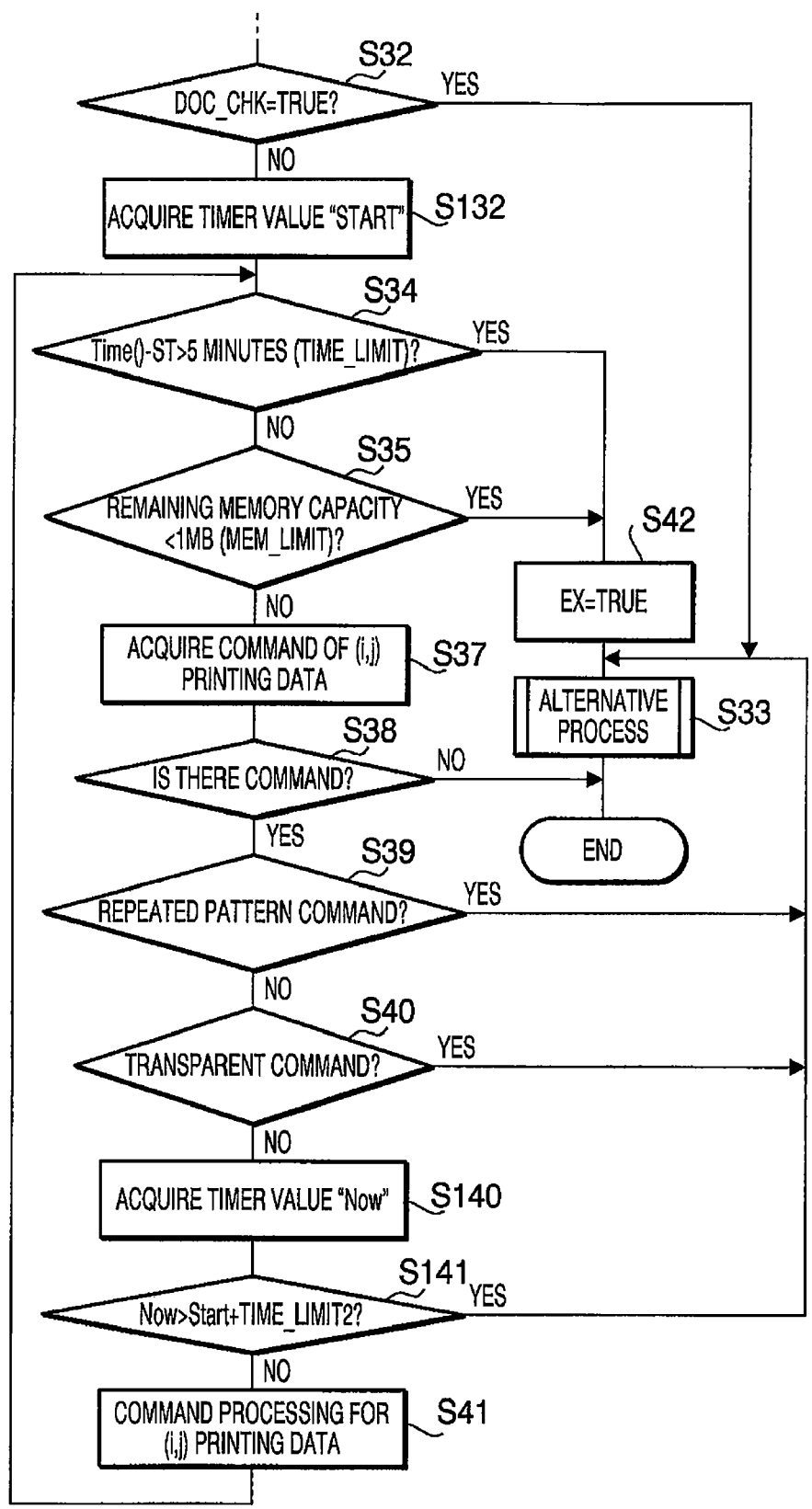

FIG. 10 is a flowchart showing a modification of the (i, j) data expanding process in accordance with one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
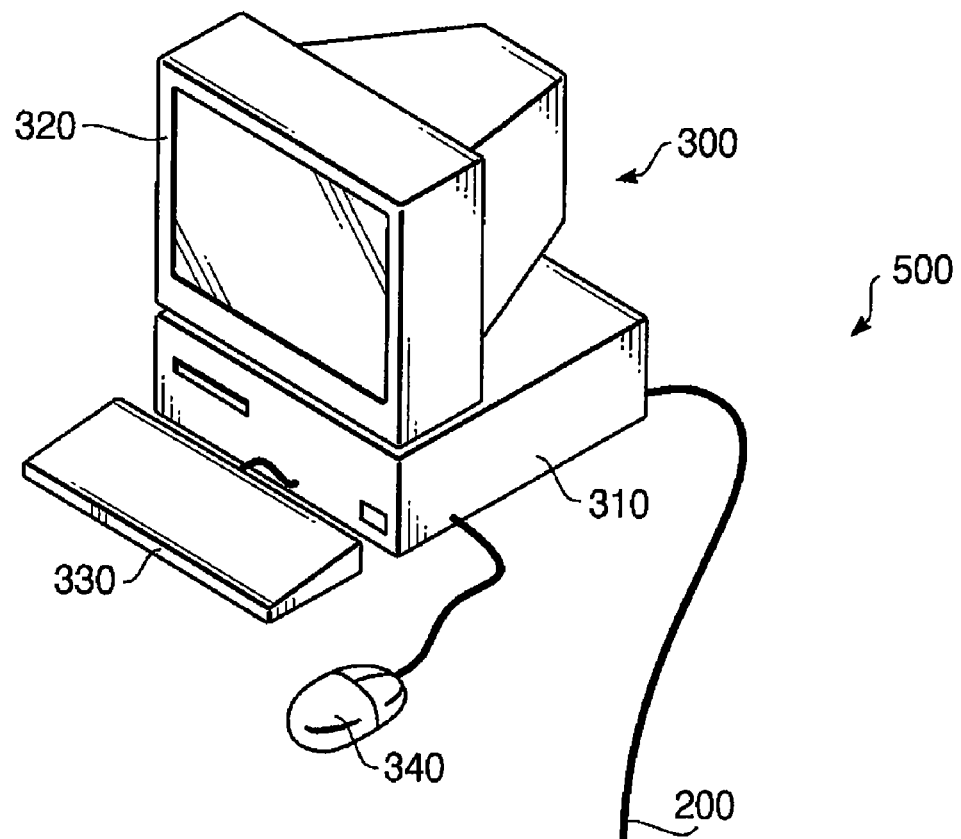
FIG. 1 is an external view schematically showing a configuration of a printing system in accordance with one or more aspects of the present invention.
Figure 1:
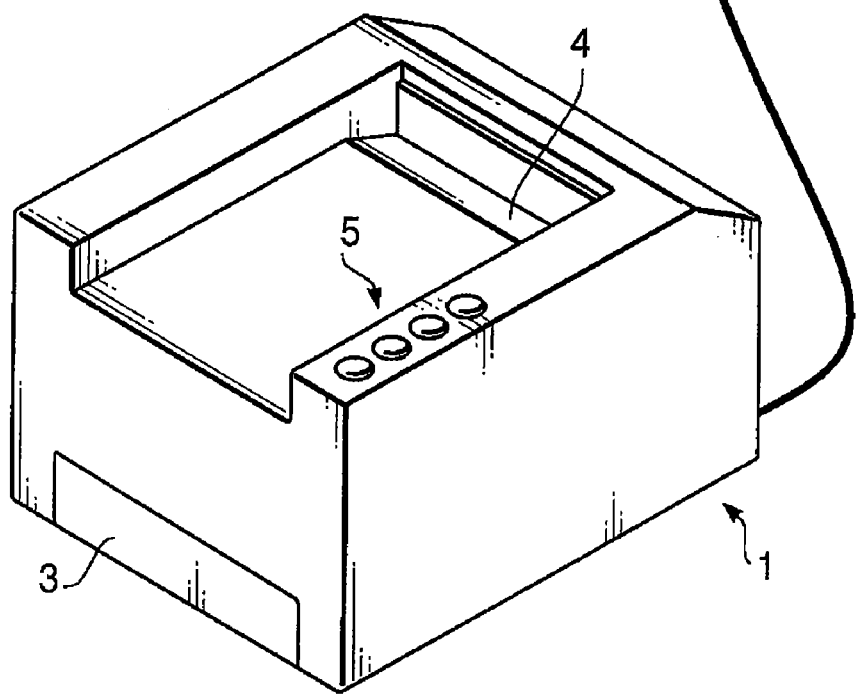

Hereinafter, embodiments according to aspects of the present invention will be described with reference to the accompanying drawings. FIG. 1 is an external view schematically showing a configuration of a printing system 500 in a first embodiment according to aspects of the present invention. As shown in FIG. 1, the printing system 500 of the first embodiment is configured with a color laser printer (hereinafter, simply referred to as a printer) 1 as an example of an image forming device, and a personal computer (hereinafter, simply referred to as a PC) 300 as an example of a printer control device connected with the printer 1 via a cable 200. It is noted that the printer 1 may be connected with the PC 300 via a network such as LAN or infrared data communication.

The printer 1 is provided with a widely known printer engine 2 (see FIG. 2) as an example of an image forming means configured to form an image with toners of yellow, magenta, cyan, and black using an electrophotographic technology. The printer engine 2 forms images onto a paper P (see FIGS. 4A and 4B) as an example of a recording medium put in a tray 3, and then the paper P with the images formed thereon is ejected to a stacker 4. In addition, the printer 1 includes thereon an operation panel 5 through which various settings and instructions can be given.

Figure 2:
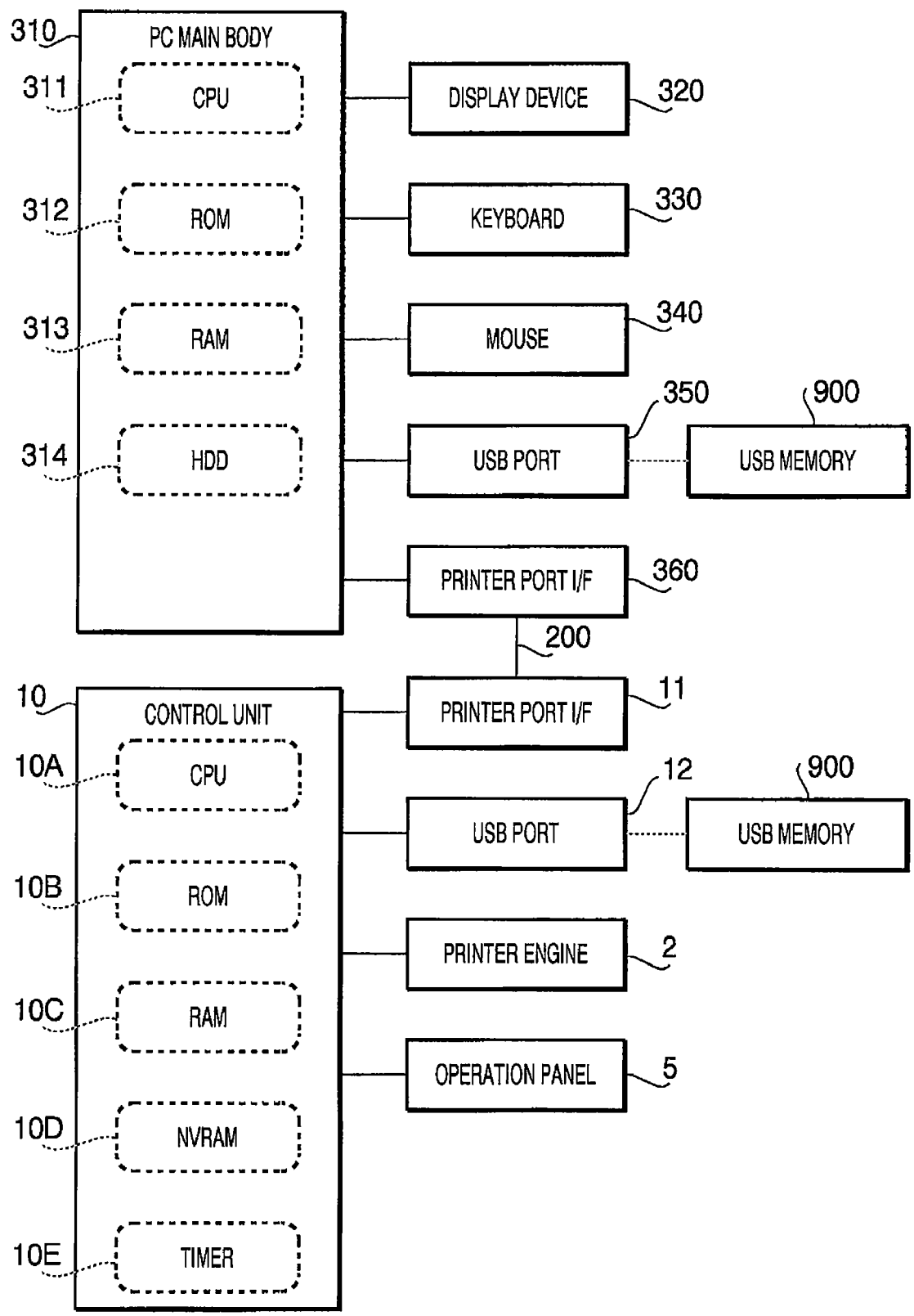
FIG. 2 is a block diagram schematically showing a configuration of a control system of the printing system in accordance with one or more aspects of the present invention.

FIG. 2 is a block diagram schematically showing a configuration of a control system in the printing system 500. As shown in FIG. 2, a main body 310 of the PC 300 includes a CPU 311, ROM 312, RAM 313, and hard disk drive (HDD) 314. The main body 310 of the PC 300 is connected with a display device 320 such as a CRT, keyboard 330, mouse 340 (see FIG. 1). Further, the main body 310 of the PC 300 is connected with a USB port 350 configured such that a USB memory can be attached thereto, printer port interface (printer port I/F) 360.

The printer 1 includes, in a housing thereof, a control unit 10 configured to control the aforementioned printer engine 2. The control unit 10 is configured as a microcomputer provided with a CPU 10A, ROM 10B, and RAM 10C. In addition, the control unit 10 is provided with an NVRAM 10D configured such that data stored therein are not deleted even though being powered OFF, and timer 10E that measures a processing time. Moreover, the control unit 10 is connected with a printer port interface (printer port I/F) 11 to be connected with the PC 300 via the cable 200, and a USB port 12 to which the USB memory 900 can be attached, as well as the aforementioned printer engine 2 and operation panel 5.

Subsequently, an index printing process to be executed by the control unit 10 of the printer 1 will be described. When a plurality of files (which may be stored in a single folder) are transmitted along with a command for instructing an index printing process, the CPU 10A of the control unit 10 performs a index printing process as described below based on programs stored in the ROM 10B. It is noted that the control unit 10 performs the same index printing process when the USB memory 900 with a plurality of files stored therein is attached to the USB port 12 and an instruction for performing the index printing process for the plurality of files stored in the USB memory 900 is inputted via the operation panel 5.

Figure 3:
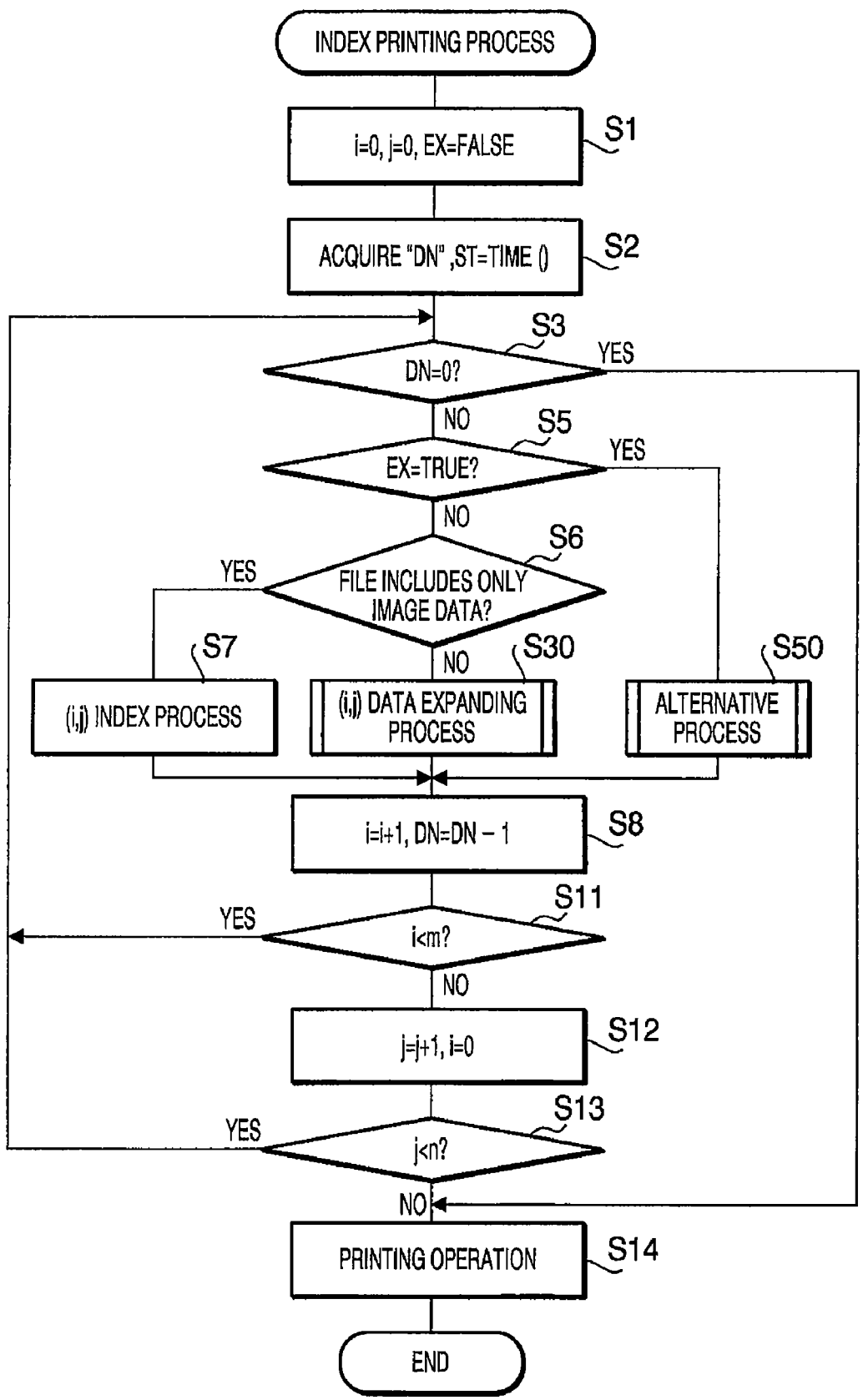
FIG. 3 is a flowchart showing a main routine of an index printing process to be executed by the control system in accordance with one or more aspects of the present invention.

FIG. 3 is a flowchart showing a main routine of the index printing process. When the process is started, firstly in a step S1, parameters "i" and "j" that represent a row and column of the index images are set to be zero, respectively, and a flag "EX" for indicating that an alternative process is to be executed for all remaining files is set to be "FALSE". In a next step S2, the number of files to which the index printing process is assigned is acquired as the number of data "DN". Further, in the step S2, a time "Time ( )" to be measured by the timer 10E at that time point is acquired as a process starting time "ST". It is noted the time "Time ( )" may be an actual clock time represented by "hour: minute: second: day: month: year", or an elapsed time since a powered-ON time of the printer 1. Further, it is noted that, in the index printing process, index images, arranged in the matrix state of "n" rows by "m" columns, are printed as shown in FIGS. 4A and 4B.

In a subsequent step S3, it is judged whether the number of data "DN" is equal to zero (DN=0). Normally, just after the index printing process is started, the number of data "DN" is not equal to zero (DN≠0) (S3: No). In this case, the process goes to a step S5. In the step S5, it is judged whether the flag "EX" is "TRUE". At the onset of the process, since the flag "EX" is set to be "FALSE" (S5: No), the process proceeds to a step S6.

In the step S6, a file corresponding to a location (i, j) at that time point is referred to, and it is judged whether the file includes only image data based on an extension thereof, for example, whether the file is a file with an extension such as ".tif" and ".bmp". When it is judged that the file includes only image data (S6: Yes), there is performed in a step S7 an (i, j) index process in which an index image (e.g., a reduced image formed with dots being thinned from an original image) corresponding to the file for the location (i, j). Then, in a step S8, the parameter "i" is incremented by one, and the number of data "DN" is decremented by one. In a step S11, it is judged whether the parameter "i" is less than a numerical constant "m", that is, whether a process for an index image at a right-most column in FIGS. 4A and 4B is completed. When it is judged that the parameter "i" is less than the numerical constant "m" (S11: Yes), the process goes to the step S3. It is noted that the numerical constant "m" is set to be the number of index images to be arranged in a row.

When the file to which the index printing process is assigned includes only image data (S6: Yes), and the parameter "i", incremented with the steps of S3 to S81 being repeated, is equal to the numerical constant "m" (i.e., "m" index images are processed) (S11: No), the process goes to a step S12. In the step S12, the parameter "j" is incremented by one for the process in a next column, and the parameter "i" is set to be zero. In a step S13, it is judged whether the parameter "j" is less than a numerical constant "n". When it is judged that the parameter "j" is less than the numerical constant "n" (j<n), namely, when the process is not completed for all rows (S13: Yes), the process goes to the step S3. It is noted that the numerical constant "n" is set as the number of rows in a printing paper.

Thus, when data of the index images of the "n" rows by "m" columns are generated, the parameter "j" is equal to "n" (S13: No), a printing operation is performed in a step S14, and the process is terminated. Thereby, as exemplified in FIG. 4A, the index images of the "n" rows by "m" columns are printed (formed) on the paper P through the printer engine 2. In addition, when the number of data "DN" becomes equal to zero (DN=0) (S3: Yes) before all of the index images of the "n" rows by "m" columns are generated (S11: Yes or S13: Yes), the process goes to a step S14 since there is no file to be printed. In this case, as shown in FIG. 4C, the index images generated by then are printed on the paper P in the matrix state of the "n" rows by "m" columns. Namely, there are printed on the paper P the index images of a number generated by then, each of which has the same size as the case of the matrix of the "n" rows by "m" columns, not completely filling the matrix of the "n" rows by "m" columns.

Meanwhile, when it is not judged that the file for the location (i, j) includes only image data (S6: No) while the aforementioned steps S3 to S13 are being repeated, an (i, j) data expanding process as described below is executed in a step S30. Then, the process goes to the step S8.

FIG. 5 is a flowchart showing a detailed procedure of the (i, j) data expanding process in the step S30 of the flowchart shown in FIG. 3. As shown in FIG. 5, firstly in this process, in a step S31, a checking process to be executed before command processing (hereinafter, referred to as a "before-command-processing checking process"), as mentioned below, is performed. The before-command-processing checking process is not a process of directly checking contents of a file, but a process of checking information attached to the file such as resource information in the case of a PDF file.

As exemplified in FIG. 6, printing data of the PDF file are configured with the resource information that includes the number of fonts, the number of images, and the number of patterns (referred to as "brush" or "tiling" in other applications) as the number of repeated patterns, and printing command data as contents that include a pattern command and transparent command. The before-command-processing checking process is a process of checking the resource information, for example, when the file for the location (i, j) is a PDF file.

FIG. 7 is a flowchart showing a detailed procedure of the before-command-processing checking process. As shown in FIG. 7, firstly in the before-command-processing checking process, in a step S301, a flag for indicating that the alternative process is to be performed for the file is set to be "FALSE". In a step S302, based on the resource information of the PDF file or the like, the number of images "IMG" of the file corresponding to the location (i, j) (hereinafter, referred to as (i, j) printing data) is acquired. In a step S303, it is judged whether the number of images "IMG" acquired in the step S302 is more than an upper limit "IMG_LIMIT" ("5" in this case) as an example of a fourth predetermined value.

When the number of images "IMG" is equal to or less than 5 (S303: No), the number of fonts "FONT" of the (i, j) printing data is acquired from the resource information of the PDF file or the like in a step S305. In a subsequent step S306, it is judged whether the number of fonts "FONT" is more than an upper limit "FONT_LIMIT" ("20" in this case) as an example of a first predetermined value.

When the number of fonts "FONT" is equal to or less than 20 (S306: No), the number of repeated patterns "PTN" of the (i, j) printing data (for example, the number of patterns of the PDF file) is acquired from the resource information of the PDF file or the like in a step S307. In a step S308, it is judged whether the number of repeated patterns "PTN" acquired in the step S307 is more than an upper limit "PTN_LIMIT" ("0" in this case) as an example of a second predetermined value.

When the number of repeated patterns "PTN" is equal to zero (S308: No), the number of transparent data of the (i, j) printing data is acquired from the resource information of the PDF file or the like in a step S309. In a step S311, it is judged whether the number of transparent data "TPN" acquired in the step S309 is more than an upper limit "TPN_LIMIT" ("0" in this case) as an example of a predetermined value.

When the number of transparent data "TPN" is equal to zero (S311: No), the process goes to a step S32 of the flowchart shown in FIG. 5. Meanwhile, when affirmative judgment is made in any of the steps S303, S306, S308, and S311, the aforementioned flag "DOC_CHK" is set to be "TRUE" in a step S312, and then the process goes to the step S32 of the flowchart shown in FIG. 5. Namely, in the before-command-processing checking process, when the number of images "IMG" of the (i, j) printing data is equal to or less than 5 (S303: No), and the number of fonts "FONT" is equal to or less than 20 (S306: No), and the number of repeated patterns "PTN" is equal to zero (S308: No), and the number of transparent data "TPN" is equal to zero (S311: No), the flag "DOC_CHK" is set to be "FALSE" (S301), otherwise set to be "TRUE" (S312).

Referring back to FIG. 5, the explanation on the (i, j) data expanding process will be continued. In a step S32, it is judged whether the flag "DOC_CHK" is set to be "TRUE". When it is judged that the flag "DOC_CHK" is set to be "TRUE" (S32: Yes), the alternative process is performed in a step S33. Thereafter, the process goes to the aforementioned step S8 of the index printing process. Here, the alternative process is a process in which there are generated data of a simpler alternative image instead of data of the index image of the file corresponding to the location (i, j). Detailed explanation on it will be given later.

Meanwhile, when it is not judged that the flag "DOC_CHK" is set to be "TRUE" (S32: No), it is judged in a step S34 whether a value obtained by subtracting the aforementioned process starting time "ST" (see S2 in the flowchart shown in FIG. 3) from a current time "Time ( )", namely, an elapsed time since the index printing process has been started is more than an upper limit "TIME_LIMIT" (5 minutes in this case) as an example of a first predetermined time. When "Time ( )-ST" is equal to or less than 5 minutes (S34: No), it is judged in a step S35 whether a remaining memory capacity of the RAM 10C is less than a lower limit "MEM_LIMIT" (1 MB in this case) as an example of a predetermined capacity. That is, the index image data generated in this process are stored in a predetermined area of the RAM 10C as an example of a memory until the printing operation (S14) is completed, and it is judged in the step S35 whether the remaining memory capacity of the predetermined area is less than 1 MB.

When it is judged that the remaining memory capacity of the predetermined area is equal to or more than 1 MB (S35: No), the process goes to a step S37, in which one command of the (i, j) printing data is expanded and acquired. In a step S38, it is judged whether there has been a command to be acquired in the step S37 in the (i, j) printing data. When the operations in the steps S37 and S38 are first performed in this process, it is impossible for all commands of the (i, j) printing data to have already been acquired. Therefore, in such a case, the judgment in the step S38 is affirmative, and the process goes to a step S39. In the step S39, it is judged whether the acquired command is a command for a repeated pattern (repeated pattern command). When it is judged that the acquired command is a repeated pattern command (S39: Yes), the process goes to the step S33, in which the alternative process is performed. Meanwhile, when it is not judged that the acquired command is a repeated pattern command (S39: No), the process goes to a step S40. In the step S 40, it is judged whether the acquired command is a command for transparent data (transparent command). When it is judged that the acquired command is a transparent command (S40: Yes), the process goes to the step S33. Meanwhile, when it is not judged that the acquired command is a transparent command (S40: No), the process goes to a step S41.

In the step S41, there is performed command processing for the command acquired in the step S37, and the process goes to the step S34. Thus by the steps S34 to S41 being repeated, the commands of the (i, j) printing data are sequentially expanded. When all of the commands have been expanded, the judgment in the step S38 is negative (S38: No), and the process goes to the step S8 of the flowchart shown in FIG. 3. In this case, the index image data corresponding to the file are normally generated based on all of the expanded commands of the (i, j) printing data.

Meanwhile, when the repeated pattern command or transparent command is expanded while the steps S34 to S41 are being repeated (S39: Yes or S40: Yes), the alternative process is performed in the step S33. Further, when "Time ( )-ST" becomes more than 5 minutes (S34: Yes) or the remaining memory capacity becomes less than 1 MB (S35: Yes) while the steps S34 to S41 are being repeated, the flag "EX" is set to be "TRUE" in the step S42, and the process goes to the step S33.

When the flag "EX" is set to be "TRUE" in the step S42, affirmative judgment is made for each remaining file in the step S5. Then, the same alternative process as the step S33 is performed in a step S50, and the process goes to the step S8. In this case, for example, as exemplified in FIG. 4B, when the flag "EX" is set to be "TRUE" from a file indicated by an arrow (S42), the alternative image (indicated by hatching in FIG. 4B) is generated for each of the all remaining files (S33, S50).

FIG. 8 is a flowchart showing a detailed procedure of the alternative process in the step S33 or S50. In this process, firstly in a step S51, there is acquired an alternative process mode "MODE" that has previously been set through the operation panel 5 or the PC 300. In a step S52, it is judged whether the alternative process mode "MODE" is "SUBSTITUTION". When it is judged that the alternative process mode "MODE" is "SUBSTITUTION" (S52: Yes), a substitute image with characters is developed in a step S53, and the process goes to the step S8 of the flowchart shown in FIG. 3. Here, the substitute image with characters is an alternative image with characters representing a file format of the file as exemplified in FIG. 9B, in contrast to a normal index image exemplified in FIG. 9A.

Meanwhile, when it is not judged that the alternative process mode "MODE" is "SUBSTITUTION" (S52: No), it is judged whether the alternative process mode "MODE" is "MARKED" in a step S54. When it is judged that the alternative process mode "MODE" is "MARKED" (S54: Yes), data for marked image (marked data) are developed in a step S55, and the process goes to the step S8 of the flowchart shown in FIG. 3. As exemplified in FIG. 9C, the marked data are data of an image generated with an index image (vacant in the case of no command expanded) corresponding to the commands expanded by then in the step S41 being covered with a hatching pattern that represents an imperfect image. The marked data are a mode of the alternative image data.

Further, when the alternative process mode "MODE" is not set to be "MARKED" (S54: No), the process goes to the step S8. In this case, there are generated data of the index image (vacant in the case of no command expanded) corresponding to the commands expanded by then in the step S41 as an index image corresponding to the file for the location (i, j). The data are a mode of the alternative image data.

Thus, in the first embodiment, when the file for the location (i, j) includes more than 5 images (S303: Yes), more than 20 fonts (S306: Yes), at least one repeated pattern such as a pattern in the PDF data (S308: Yes, or S39: Yes), or at least one transparent data (S311: Yes, or S40: Yes), there are generated the alternative image data instead of the index image data corresponding to the file (S33, or S50). Therefore, in the first embodiment, it is possible to reduce time taken for index image generation by generating the alternative image data as substitute for the normal index image data for a file that needs much time for the index image generation. Accordingly, when there are formed onto the paper P index images that correspond to a plurality of files, respectively, it is possible to quickly form the index images without taking much time for processing of the files.

In the first embodiment, the alternative process is performed when even one repeated pattern is included. It is noted that, when the alternative process is performed in the case where the number of the repeated patterns is more than 2 (namely, when the upper limit "PTN_LIMIT" is set equal to or more than one), the number of repeated patterns may be the number of locations where repeated patterns are instructed to be formed or the number of kinds of repeated patterns. Appropriate choice is possible between them in consideration of which can more effectively reduce time taken for the file processing.

Further, in the first embodiment, when it takes more than 5 minutes to generate the index image data since the process has been started (S34: Yes), or when the remaining memory capacity becomes less than 1 MB (S35: Yes), the alternative image data are generated for all remaining files (S42 or S33). Therefore, the time for the file processing is further reduced, and the memory capacity is favorably secured.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

For example, in addition to the above configuration, the alternative process may be executed when time taken for generating data of an index image for a file is more than a predetermined time.

FIG. 10 is a flowchart showing a procedure in a second embodiment. It is noted that the second embodiment is different from the aforementioned first embodiment by a step S132 inserted between the steps S32 and S34 of the flowchart shown in FIG. 5 and steps inserted between the steps S40 and S41 of the flowchart shown in FIG. 5. Since the other aspects in the second embodiment are the same as the first embodiment, only the differences therebetween will be described.

In the (i, j) data expanding process (S30), when the process goes to the step S32 with the "DOC_CHK" being set to be "FALSE" in the before-and-processing checking process (S31), the judgment in the step S32 is negative (S32: No). Then, the process goes to the step S132, in which a time at that time point "Time ( )" is acquired as a timer value "Start", and thereafter the process goes to the step S34. Further, when the process goes to the step S40 via the aforementioned steps S34 to S39 and the judgment in the step S40 is negative (S40: No), a time at that time point "Time ( )" is acquired as a timer value "Now" in the step S140. Thereafter, in the step S141, it is judged whether the "Now" is more than a value obtained by adding a predetermined value "TIME_LIMIT2" as an example of a second predetermined time to the "Start". When the judgment in the step S141 is affirmative (namely, "Now">"Start"+"TIME_LIMIT2") (S141: Yes), the process goes to the step S33, in which the alternative process is executed. Meanwhile, when the judgment in the step S141 is negative (namely, "Now"≦"Start"+"TIME_LIMIT2") (S141: No), the process goes to the step S41, in which the command processing for the printing data is performed.

In this case, when it takes more than the "TIME_LIMIT2" to expand the (i, j) printing data into commands and generate the index image data (S141: Yes), the alternative process (S33) is performed. Therefore, it is further preferably achieved to reduce processing time by generating the alternative image data instead of the normal index image data for a file that needs much time for the index image generation therefor.

It is noted that various modes other than the aforementioned modes may be possible for the alternative image data. For example, there may be possible image data generated with ignoring a relevant transparent command, or image data with all characters being formed with a default font. Furthermore, there may be possible as an alternative image a display of a default character string such as "Index image generation is interrupted because of too large data therefor". However, in this regard, it is noted that an alternative image as a user wishes may be formed as substitute for the index image when the alternative image is formed based on the alternative process mode "MODE" set by the user as mentioned in the first embodiment. Further, in the present invention, the configuration of the image forming device is not limited to that described in the first embodiment. The present invention may be applied to an image forming device such as an inkjet printer.

What is claimed is:

1. An image forming device capable of forming index images that correspond to a plurality of files, respectively, onto a recording medium, comprising:
    an image data generating unit configured to generate one of first image data and second image data as data for forming the index image corresponding to each of the plurality of files;
    a file selecting unit configured to select, from the plurality of files, files which comprise at least one parameter other than image data;
    a parameter detecting unit configured to detect the at least one parameter for each of the files selected by the file selecting unit;
    a parameter judging unit configured to judge whether the at least one parameter detected by the parameter detecting unit satisfies a predetermined condition; and
    a control unit configured to control the image data generating unit to generate one of the first image data and the second image data based on the judgment by the parameter judging unit,
    wherein the control unit is configured to control the image data generating unit to generate the second image data, when the parameter judging unit judges that the at least one parameter detected by the parameter detecting unit satisfies the predetermined condition, and to generate the first image data, when the parameter judging unit judges that the at least one parameter detected by the parameter detecting unit does not satisfy the predetermined condition,
    wherein the parameter detecting unit includes a time measuring unit configured to measure a time period taken for the data generation by the image data generating unit for each of the selected files,
    wherein the parameter judging unit is configured to judge, for each of the selected files, whether the time period measured by the time measuring unit is more than a predetermined time period, and
    wherein the control unit is configured to control the image data generating unit to generate the second image data for each file for which the parameter judging unit judges that the time period is more than the predetermined time period.

2. The image forming device according to claim 1,
    wherein the second image data are data to be generated as substitute for the first image data to be more simplified than the first image data.

3. The image forming device according to claim 1,
    wherein the parameter detecting unit includes a font number detecting unit configured to detect a numerical quantity of fonts included in each of the selected files,
    wherein the parameter judging unit is configured to judge, for each of the selected files, whether the numerical quantity of the fonts detected by the font number detecting unit is more than a predetermined value, and
    wherein the control unit is configured to control the image data generating unit to generate the second image data for each file for which the parameter judging unit judges that the numerical quantity of the fonts is more than the predetermined value.

4. The image forming device according to claim 1,
    wherein the parameter detecting unit includes a repeated pattern number detecting unit configured to detect a numerical quantity of repeated patterns included in each of the selected files,
    wherein the parameter judging unit is configured to judge, for each of the selected files, whether the numerical quantity of the repeated patterns detected by the repeated patter number detecting unit is more than a predetermined value, and
    wherein the control unit is configured to control the image data generating unit to generate the second image data for each file for which the parameter judging unit judges that the numerical quantity of the repeated patterns is more than the predetermined value.

5. The image forming device according to claim 1,
    wherein the parameter detecting unit includes a transparent data number detecting unit configured to detect a numerical quantity of transparent data included in each of the selected files,
    wherein the parameter judging unit is configured to judge, for each of the selected files, whether the numerical quantity of the transparent data detected by the transparent data number detecting unit is more than a predetermined value, and
    wherein the control unit is configured to control the image data generating unit to generate the second image data for each file for which the parameter judging unit judges that the numerical quantity of the transparent data is more than the predetermined value.

6. The image forming device according to claim 1,
    wherein the parameter detecting unit includes an image number detecting unit configured to detect a numerical quantity of images included in each of the selected files,
    wherein the parameter judging unit is configured to judge, for each of the selected files, whether the numerical quantity of the images detected by the image number detecting unit is more than a predetermined value, and
    wherein the control unit is configured to control the image data generating unit to generate the second image data for each file for which the parameter judging unit judges that the numerical quantity of the images is more than the predetermined value.

7. The image forming device according to claim 1,
    wherein the time measuring unit is further configured to measure an elapsed time period since a start of index image formation for the plurality of files,
    wherein the parameter judging unit is configured to judge whether the elapsed time period measured by the time measuring unit is more than a predetermined time period, and
    wherein the control unit is configured to control the image data generating unit to generate the second image data for each file remaining without data for forming an index image being generated therefor when the parameter judging unit judges that the elapsed time period is more than the predetermined time period.

8. The image forming device according to claim 1, further comprising a memory configured to store therein data generated by the image data generating unit,
wherein the parameter detecting unit includes a remaining memory capacity detecting unit configured to detect a remaining memory capacity of the memory,
wherein the parameter judging unit is configured to judge whether the remaining memory capacity detected by the remaining memory capacity detecting unit is less than a predetermined capacity, and
wherein the control unit is configured to control the image data generating unit to generate the second image data for each file remaining without data for forming an index image being generated therefor when the parameter judging unit judges that the remaining memory capacity is less than the predetermined capacity.

9. The image forming device according to claim 1, further comprising a mode setting unit configured to set a mode of the second image data to be generated by the image data generating unit,
wherein the image data generating unit is configured to generate the second image data according to the mode set by the mode setting unit.

10. A non-transitory computer readable medium having computer readable instructions stored thereon, which cause a computer capable of forming index images that correspond to a plurality of files, respectively, onto a recording medium to perform steps of:
selecting, from the plurality of files, files which comprise at least one parameter other than image data;
detecting the at least one parameter for each of the selected files;
judging whether the at least one parameter detected in the detecting step satisfies a predetermined condition; and
generating one of first image data and second image data as data for forming an index image corresponding to each of the selected files based on the judgment in the judging step,
wherein the second image data is generated, when the at least one parameter detected in the detecting step is judged to satisfy the predetermined condition, and the first image data is generated, when the at least one parameter detected in the detecting step is judged not to satisfy the predetermined condition,
wherein the detecting step includes a step of measuring a time period taken for the data generation for each of the selected files in the generation step,
wherein the judging step includes a step of judging, for each of the selected files, whether the measured time period is more than a predetermined time period, and
wherein the generating step includes a step of generating the second image data for each file for which it is judged that the measured time period is more than the predetermined time period.

11. The computer readable medium according to claim 10, wherein the second image data are more simplified data than the first image data.

12. The computer readable medium according to claim 10,
wherein the detecting step includes a step of detecting a numerical quantity of fonts included in each of the selected files,
wherein the judging step includes a step of judging, for each of the selected files, whether the numerical quantity of the fonts as detected is more than a predetermined value, and
wherein the generating step includes a step of generating the second image data for each file for which it is judged that the numerical quantity of the fonts is more than the predetermined value.

13. The computer readable medium according to claim 10,
wherein the detecting step includes a step of detecting a numerical quantity of repeated patterns included in each of the selected files,
wherein the judging step includes a step of judging, for each of the selected files, whether the numerical quantity of the repeated patterns as detected is more than a predetermined value, and
wherein the generating step includes a step of generating the second image data for each file for which it is judged that the numerical quantity of the repeated patterns is more than the predetermined value.

14. The computer readable medium according to claim 10,
wherein the detecting step includes a step of detecting a numerical quantity of transparent data included in each of the selected files,
wherein the judging step includes a step of judging, for each of the selected files, whether the numerical quantity of the transparent data as detected is more than a predetermined value, and
wherein the generating step includes a step of generating the second image data for each file for which it is judged that the numerical quantity of the transparent data is more than the predetermined value.

15. The computer readable medium according to claim 10,
wherein the detecting step includes a step of detecting a numerical quantity of images included in each of the selected files,
wherein the judging step includes a step of judging, for each of the selected files, whether the numerical quantity of the images as detected is more than a predetermined value, and
wherein the generating step includes a step of generating the second image data for each file for which it is judged that the numerical quantity of the images is more than the predetermined value.

16. The computer readable medium according to claim 10,
wherein the detecting step includes a step of measuring an elapsed time period since a start of index image formation for the plurality of files,
wherein the judging step includes a step of judging whether the elapsed time period as measured is more than a predetermined time period, and
wherein the generating step includes a step of generating the second image data for each file remaining without data for forming an index image being generated therefor when it is judged that the elapsed time period is more than the predetermined time period.

17. The computer readable medium according to claim 10,
wherein the computer includes a memory configured to store therein data generated in the generating step,
wherein the detecting step includes a step of detecting a remaining memory capacity of the memory,
wherein the judging step includes a step of judging whether the remaining memory capacity as detected is less than a predetermined capacity, and
wherein the generating step includes a step of generating the second image data for each file remaining without data for forming an index image being generated therefor when it is judged that the remaining memory capacity is less than the predetermined capacity.

18. The computer readable medium according to claim 10, further comprising a step of setting a mode of the second image data to be generated in the generating step,
wherein the generating step includes a step of generating the second image data according to the mode set in the setting step.

19. An image forming device capable of forming index images that correspond to a plurality of files, respectively, onto a recording medium, comprising:
an image data generating unit configured to generate one of first image data and second image data as data for forming the index image corresponding to each of the plurality of files;
a file selecting unit configured to select, from the plurality of files, files which comprise at least one parameter other than image data;
a parameter detecting unit configured to detect the at least one parameter for each of the files selected by the file selecting unit;
a parameter judging unit configured to judge whether the at least one parameter detected by the parameter detecting unit satisfies a predetermined condition;
a control unit configured to control the image data generating unit to generate one of the first image data and the second image data based on the judgment by the parameter judging unit,
wherein the control unit is configured to control the image data generating unit to generate the second image data, when the parameter judging unit judges that the at least one parameter detected by the parameter detecting unit satisfies the predetermined condition, and to generate the first image data, when the parameter judging unit judges that the at least one parameter detected by the parameter detecting unit does not satisfy the predetermined condition; and a memory configured to store therein data generated by the image data generating unit,
wherein the parameter detecting unit includes: a time measuring unit configured to measure a time period taken for the data generation by the image data generating unit for each of the selected files, and a remaining memory capacity detecting unit configured to detect a remaining memory capacity of the memory,
wherein the parameter judging unit is configured to judge, for each of the selected files, whether the time period measured by the time measuring unit is more than a predetermined time period, and to judge whether the remaining memory capacity detected by the remaining memory capacity detecting unit is less than a predetermined capacity, and wherein the control unit is configured to control the image data generating unit to generate the second image data for each file remaining, without data for forming an index image being generated therefor, when the parameter judging unit judges that either the time period is more than the predetermined time period or the remaining memory capacity is less than the predetermined capacity.

20. A non-transitory computer readable medium having computer readable instructions stored thereon, which cause a computer capable of forming index images that correspond to a plurality of files, respectively, onto a recording medium to perform steps of:
selecting, from the plurality of files, files which comprise at least one parameter other than image data;
detecting the at least one parameter for each of the selected files;
judging whether the at least one parameter detected in the detecting step satisfies a predetermined condition; and
generating one of first image data and second image data as data for forming an index image corresponding to each of the selected files based on the judgment in the judging step,
wherein the second image data is generated, when the at least one parameter detected in the detecting step is judged to satisfy the predetermined condition, and the first image data is generated, when the at least one parameter detected in the detecting step is judged not to satisfy the predetermined condition, wherein the computer includes a memory configured to store therein data generated in the generating step,
wherein the detecting step includes: a step of measuring a time period taken for the data generation for each of the selected files in the generating step, and a step of detecting a remaining memory capacity of the memory,
wherein the judging step includes a step of judging, for each of the selected files, whether the measured time period is more than a predetermined time period, and whether the remaining memory capacity as detected is less than a predetermined capacity,
wherein the generating step includes a step of generating the second image data for each file remaining, without data for forming an index image being generated therefore, when it is judged that either the measured time period is more than the predetermined time period or the remaining memory capacity is less than the predetermined capacity.

* * * * *